United States Patent Office 3,006,860
Patented Oct. 31, 1961

3,006,860
ASPHALT EMULSIONS
Walter E. Heinz, Roxana, Ill., assignor to Shell Oil Company, a corporation of Delaware
No Drawing. Filed June 25, 1959, Ser. No. 822,730
5 Claims. (Cl. 252—311.5)

This invention relates to improved asphalt emulsions. More particularly, it relates to asphalt emulsions having higher viscosities for a given asphalt and water content.

Asphalt emulsions are broadly divided into two main classes. These comprise water-in-oil emulsions and oil-in-water emulsions. The present invention is concerned with the latter type. Among the properties of asphalt emulsions which are important and which must be varied according to the contemplated utility are viscosity, and asphalt content. The viscosity of emulsions is important for such purposes as application to crowned road beds and the like, where the tendency to run off a sloping surface must be minimized. For paving purposes, most specifications place a maximum of about 2% of ash based on the asphalt. Consequently, strict limitations are placed upon the proportion and type of ingredients which may be employed for viscosity control. Numerous influences enter into viscosity other than water and asphalt content. These comprise the colloidal properties of specific asphalts, the particular types of emulsifying agent employed, the degree of dispersion of the asphalt (particle size) and numerous other factors.

Many types of emulsifying agents have been utilized in the preparation of asphalt emulsions. These have been modified by the addition of numerous stabilizers, dispersants, auxiliary surface active agents, colloids, and salts to provide specific properties, especially with respect to viscosity and stability, in order to adjust the properties of the emulsion for a particular use. Water-dispersible soaps are the most common type of emulsifying agents employed in asphalt emulsions.

Many asphalts contain varying amounts of salt water. This salt water content will vary widely dependent upon the source and state of a particular oil well. The salt content has a profound effect upon the pumping viscosity of asphalt emulsions. It has been postulated that the reason for this is that the inorganic salt present in the asphalt acts in an osmotic system whereby water is absorbed into the asphalt, thereby increasing the effective volume of the asphalt droplets and consequently, the viscosity of the system. Since asphalts vary so considerably in their salt content, asphalt emulsions containing the same quantity of asphalt and emulsifier may have widely varying viscosities.

Another problem faced by the producers of asphalt emulsions is the specifications set up by consumers which include both viscosity limitations and limitations upon a percentage of asphalt which may be present in the emulsions. Those asphalts containing less than the average quantity of salt, however, will produce emulsions near the higher limit of asphalt content specifications and at the same time near the lower limits specified for viscosity. Many asphalts fall into this category of having too low or too variable a salt content for satisfactory emulsion control.

One means of alleviating this situation is to incorporate a saturated salt water-in-oil emulsion dope in the asphalt phase. While this provides a certain measure of relief, it has been found that the commercially available salt emulsions are unstable and have a tendency to become less effective upon storage. Also, the preparation of asphalt emulsions containing such emulsified salt dopes is cumbersome and time consuming. Even with these methods, the operating range for emulsion manufacture is restricted to a range of asphalt contents of no more than about 1% to avoid an asphalt content too high and a viscosity too low to meet consumers' specifications.

It is an object of the present invention to provide asphalt-in-water emulsions which may be varied in viscosity over a relatively wide range. It is a particular object of this invention to provide asphalt-in-water emulsions meeting both asphalt content and viscosity specifications as well as ash limitations without resorting to the use of salt-containing dopes or other means for viscosity control. Other objects will become apparent from the following detailed description of the invention.

Now, in accordance with the present invention, it has been found that the viscosity of asphalt-in-water emulsions suitable for the production of paving compositions can be closely regulated by the combination of a hydrophilic clay and a water-dispersible polysaccharide derivative. More particularly, it is necessary to maintain the pH of the aqueous phase of the emulsion between about 10 and 11.2 since only between these pH limits do the combined additives exhibit a synergistic effect upon viscosity of the emulsion. Moreover, below about pH 10 the emulsions become exceptionally unstable and are unsuitable for most pavement producing processes. Still more particularly, the compositions coming within the present invention comprise asphalt-in-water emulsions containing an emulsifying proportion of a water-dispersible alkali metal soap, an aqueous phase having dispersed therein a clay (which is preferably a bentonite) in an amount of less than 2% by weight of the asphalt and a water-dispersible cellulose derivative, the weight ratio of clay to cellulose derivative being between about 6:1 to 2:1, the pH of the aqueous phase being between about 10 and 11.2.

The combination of clay with the water-dispersible cellulose derivative within the ratio of concentrations to be discussed exhibits a synergistic viscosity-increasing effect upon these asphalt emulsions. In order to prevent the excessive use of filled asphalts for paving purposes, it is necessary to maintain the ash-forming components in the emulsion at less than about 2% ash based on asphalt according to most specifications. This consequently restricts the amount and kind of materials which may be incorporated in the emulsion. In the present instance, it limits the maximum amount of clay which may be employed. Consequently, and in accordance with numerous specifications drawn to paving grade asphalts, the emulsions should contain no more than about 2% by weight of clay based on the weight of the asphalt.

The clays particularly contemplated include the montmorillonites especially the sodium, potassium or lithium bentonites, such as Wyoming bentonite, magnesium bentonite (sometimes called hectorite) and saponite. Also nontronite, attapulgite, and fuller's earths, particularly those of the Georgia-Florida type. Preferably, the clays are those which exhibit a substantial base exchange capacity, since these are found to have the relatively high swelling characteristics desired in the presence of water. Preferably, the base exchange capacities of the various clays enumerated run from about 15 to about 100 milliequivalents exchangeable base per 100 grams of the clay. The montmorillonites have comparatively high base exchange capacity, usually 60-100. Attapulgite and illite have substantial base exchange capacities (15-40). Generally, the clays of higher base exchange capacity, namely, having at least an exchange capacity of 25 are particularly useful in the asphalt emulsions of this invention.

The clays such as those enumerated above exhibit a limited thickening power in asphalt emulsions. This is established by data contained in the examples which follow. In order to increase the viscosity of many asphalt emulsions to greater extent, it is necessary to utilize an excessive amount of clay which, as referred to before, becomes objectionable when the proportion of clay to asphalt is in excess of about 2% by weight.

The use of water-dispersible cellulose derivatives for increasing the viscosity of asphalt emulsions has been considered heretofore, but due to the relatively high cost of these materials, their use is limited in an economic sense. It is therefore desirable to utilize a relatively low-cost material, such as clay, in order to supplement the highly effective water-soluble cellulose derivatives for viscosity increase. In the course of examining compositions such as those contemplated, it was discovered that a synergistic effect is exhibited in the viscosity of asphalt emulsions when the proportion of clay to water-dispersible cellulose derivative is maintained within the range from about 6:1 to about 2:1 and, equally important, when the pH of the aqueous phase of the emulsion is restricted to from about 10.0 to 11.2.

The water-dispersible polysaccharide (e.g., starch or cellulose) derivatives suitable for use in the asphalt emulsions of this invention comprise three principal categories. The preferred class includes the alkali metal (preferably sodium) salts of carboxy methyl cellulose. Secondly, hydroxy ethyl cellulose and thirdly, methyl cellulose. The chemical nature and properties of these cellulose derivatives are well known and therefore require no further description. The corresponding starch derivatives may be used in place of or in addition to the cellulose derivatives. The derivatives exist in a variety of viscosity grades dependent not only upon the degree of substitution of the indicated functional group, such as carboxymethyl, for hydroxyl groups, but also upon the degree of polymerization (or depolymerization) of the cellulose. Mixed derivatives as well as mixtures of derivatives may be utilized.

As the working examples show, a substantial and unexpected synergistic effect is obtained by certain combinations of these two classes of agents. This combination, therefore, enables the production of asphalt emulsions having unexpectedly increased viscosities for a given asphalt content. Also, this enables the production of asphalt emulsions having a wide variety of viscosities for a given asphalt content. With respect to commercial utilization of such emulsions, it is also important that the use of this invention enables the simultaneous attainment of viscosity and asphalt content requirements according to numerous asphalt emulsion specifications.

In addition to the thickening agents, namely, the clay and water-dispersible cellulose derivatives, the emulsions must contain an emulsifying agent, many of which are well known in this art, of which the most satisfactory are the water-dispersible soaps. Still more preferably the emulsifier is an alkali metal soap of higher fatty acids. The higher fatty acids may comprise the mixtures of acids found in naturally occurring products, such as tall oil, fish oils, vegetable oils and the like. Normally, the soaps will be sodium or potassium soaps of one or more acids, such as lauric, myristic, palmitic, stearic, oleic, ricinoleic, linoleic or linolenic acids and mixtures of these. Other suitable sources of acids include coconut oil, palm kernel oil, corn oil, cottonseed oil, sardine oil, soybean oil, or peanut oil. Partially or completely hydrogenated animal and vegetable oils may be utilized in addition to or in place of other acids, such as the carboxylic acids produced by the oxidation of petroleum or paraffin waxes and the like.

The water-soluble emulsifying agents are preferably utilized in amounts between about 0.25% and 2%, based on the weight of the water phase. Emulsions normally meeting the ordinary customers' specifications contain between about 55 and 70% by weight of asphalt and have viscosities between about 20 (S.S.F.) seconds Saybolt Furol at 77° F. and about 450 seconds Saybolt Furol at 122° F. These are usually divided into two specification groups and are normally regarded as quick setting emulsions or the so-called RS (rapid setting) emulsions. Customers' specifications divide these as RS-1 and RS-2 emulsions. RS-1 emulsions usually are limited by customers' specifications to those emulsions having a viscosity at 77° F. Saybolt Furol seconds between 20 and 100, while at the same time the asphalt content must be maintained between 57 and 62 weight percent, based on the total emulsion. RS-2 emulsions are ordinarily limited to those wherein the viscosity at 122° F. is between about 100 and 400 Saybolt Furol seconds while having an asphalt content between about 62 and 69% by weight.

The asphalts employed in the present emulsions are those of paving grade and normally will have penetrations at 77° F. between about 20 and about 300 and Ring and Ball softening points between 100 and about 130. The asphalt is warmed to about 250–325° F. so that it is quite fluid and is then passed to a colloid mill where it is subjected to a high rate of shear with the water phase containing the emulsifying agent.

In order to illustrate the practical limitations of the compositions, emulsions were prepared containing 1.5% by weight of tall oil with varying amounts of sodium hydroxide, with and without bentonite and/or sodium carboxy methyl cellulose, as noted in Table I, the asphalt content of the emulsion being maintained at 65% by weight. The proportion of sodium hydroxide employed was such that 75% of the tall oil acids was neutralized by the hydroxide at pH 10, substantially equivalent amounts of sodium hydroxide and tall oil acids were present at pH 11, and 25% excess of hydroxide over acids was present at pH 11.5. At alkalinities below pH 10 the emulsions are excessively unstable while above about pH 11.2 virtually no synergistic effect was obtained by the combination of clay and sodium carboxy methyl cellulose.

According to Table I, it will be seen that the viscosity of the emulsions containing no viscosity control agents was excessively low in comparison with the specifications set out above relative to RS-2 emulsions. The addition of 1% of bentonite to the three different emulsions caused an insignificant increase in the emulsion viscosity. The change in viscosity was entirely insufficient insofar as meeting the specifications for RS-2 emulsions. When using 0.25% by weight of sodium carboxy methyl cellulose in the absence of any clay moderate increases in emulsion viscosity were noted. However, the combination of clay with the sodium carboxy methyl cellulose resulted in an entirely unexpected synergistic effect upon the emulsion viscosity when the pH was 10.0 and when it was 11.0. At the higher pH (11.5) wherein excess sodium hydroxide was present, the synergistic effect was of too small an order to be beneficial.

Table I

| Concentration, Percent w. | | Emulsion Viscosity at 122° F. (S.S.F.) | | |
|---|---|---|---|---|
| Bentonite (Volclay 325 Mesh) | Sodium Carboxy Methyl Cellulose | pH 11.5 | pH 11.0 | pH 10.0 |
| -------- | -------- | 22 | 22 | 22 |
| 1.0 | -------- | 23 | 27 | 33 |
| -------- | 0.25 | 88 | 110 | 135 |
| 1.0 | 0.25 | 115 | 160 | 220 |

It has been found that if the asphalt emulsions contain more than about 10% excess free base beyond that required for the neutralization of fatty acids, the synergistic effect upon emulsion viscosity referred to above is virtually absent. On the other hand, if the asphalt emulsions contain more than about 10% unsaponified fatty acids, based on the weight of emulsifying soaps, then the emulsions are excessively unstable.

While the asphalt emulsions according to this invention may contain certain ingredients which have not been specified here, it has been found to be undesirable to include therein fibrous fillers and the like if the proportions thereof are of an amount imparting more than about 2% by weight of ash to the composition, since these tend to alter the characteristics of the emulsions to such an extent that they are not useful for paving purposes. Moreover, the excessive use of such fibrous fillers (e.g., asbestos) minimize the viscosity improving aspects of this invention.

I claim as my invention:

1. An oil-in-water asphalt emulsion having about 50–70 percent by weight of asphalt and an emulsifying proportion of water dispersable alkali metal soap of higher fatty acids, the asphalt phase being a paving grade asphalt, the aqueous phase having a pH between 10.0 and 11.2 and consisting essentially of water, an emulsion viscosity increasing combination of a water-swellable clay having a base exchange capacity of about 15–100 milliequivalents exchangeable base per 100 grams of clay and a water-dispersible cellulose derivative of the group consisting of alkali metal salts of carboxymethyl cellulose, methyl cellulose, hydroxy ethyl cellulose and mixtures thereof, the weight proportion of clay to cellulose derivative being between about 6:1 and about 2:1, the maximum amount of ash-forming components being 2% by weight based on the asphalt.

2. An asphalt emulsion of the oil-in-water type, the emulsion having about 50–70 percent by weight of asphalt and dispersed therein a minor emulsifying amount of water dispersable alkali metal soap of higher fatty acids, the water phase of the emulsion having a pH between 10.0 and 11.2 and consisting essentially of water, a water-swellable clay having a base exchange capacity of about 15–100 milliequivalents exchangeable base per 100 grams of clay and a water-dispersible cellulose derivative of the group consisting of alkali metal salts of carboxymethyl cellulose, methyl cellulose, hydroxy ethyl cellulose and mixtures thereof dispersed therein, the amount of clay being between about 0.5% and about 2% by weight of the asphalt, the weight ratio of clay to cellulose derivative being between about 6:1 and about 2:1, the combined clay and cellulose derivative being sufficient to materially increase the viscosity of the emulsion, and the asphalt being of paving grade consistency, having a penetration between about 20 and 200 at 77° F. and a Ring and Ball softening point between 100 and 130° F., the emulsion containing less than 2% by weight, based on the asphalt, of ash.

3. An emulsion according to claim 1 having a viscosity between about 20 S.S.F. at 77° F. and about 450 S.S.F. at 122° F.

4. An asphalt emulsion of the oil-in-water type consisting essentially of an emulsifying proportion of an alkali metal soap of higher fatty acids, 57–69% of the emulsion being a paving grade asphalt, said asphalt having a penetration between 20 and 300 at 77° F. and a Ring and Ball softening point between 100 and 130° F., and an aqueous phase consisting essentially of water, 0.75–1.5% bentonitic clay and an alkali metal salt of carboxy methyl cellulose, the clay:salt weight ratio being between 5:1 and 3:1, the pH of the aqueous phase being between 10.2 and 11.1, the emulsion containing less than 2% by weight, based on the asphalt, of ash.

5. An asphalt emulsion of the oil-in-water type consisting essentially of an emulsifying proportion of sodium soaps of tall oil acids, 62–69% by weight of the emulsion being an asphalt, the aqueous phase having a pH between 10 and 11 and consisting essentially of water, 0.75–1.5% bentonite and sodium carboxy methyl cellulose, the weight ratio of the bentonite to cellulose derivative being between 5:1 and 3:1, the viscosity of the emulsion being between 100 and 40 SF seconds at 120° F., the emulsion containing less than 2% by weight, based on the asphalt, of ash.

References Cited in the file of this patent

UNITED STATES PATENTS 2,733,159    Scoggin et al. _____ Jan. 31, 1956